May 2, 1944.
H. W. MELLING
2,347,748
TURF PERFORATOR
Filed May 17, 1940
4 Sheets-Sheet 2
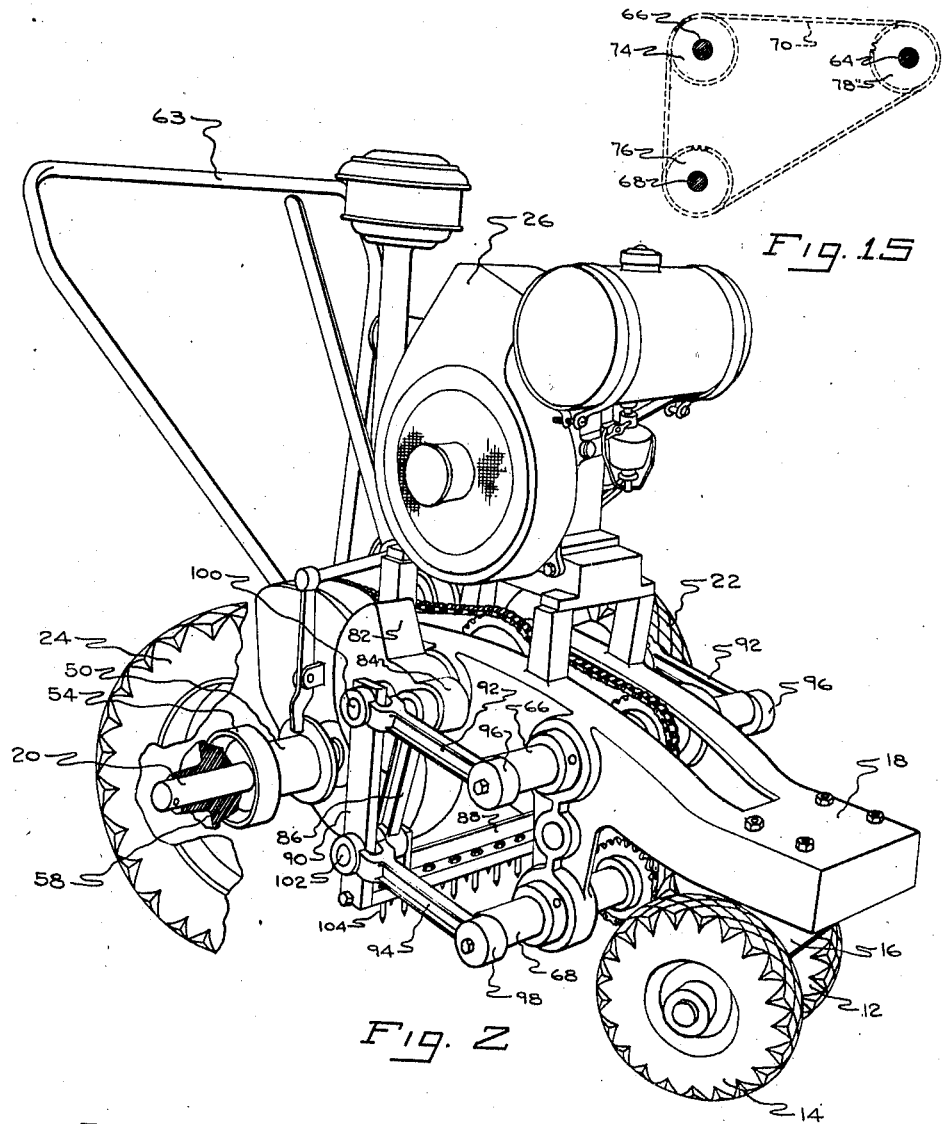
Fig. 15
Fig. 2
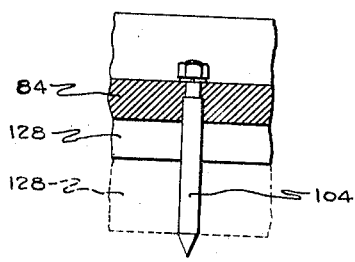
Fig. 12
HERMAN W. MELLING, Inventor
By Beaman & Langford
Attorneys May 2, 1944.     H. W. MELLING     2,347,748
TURF PERFORATOR
Filed May 17, 1940     4 Sheets-Sheet 3

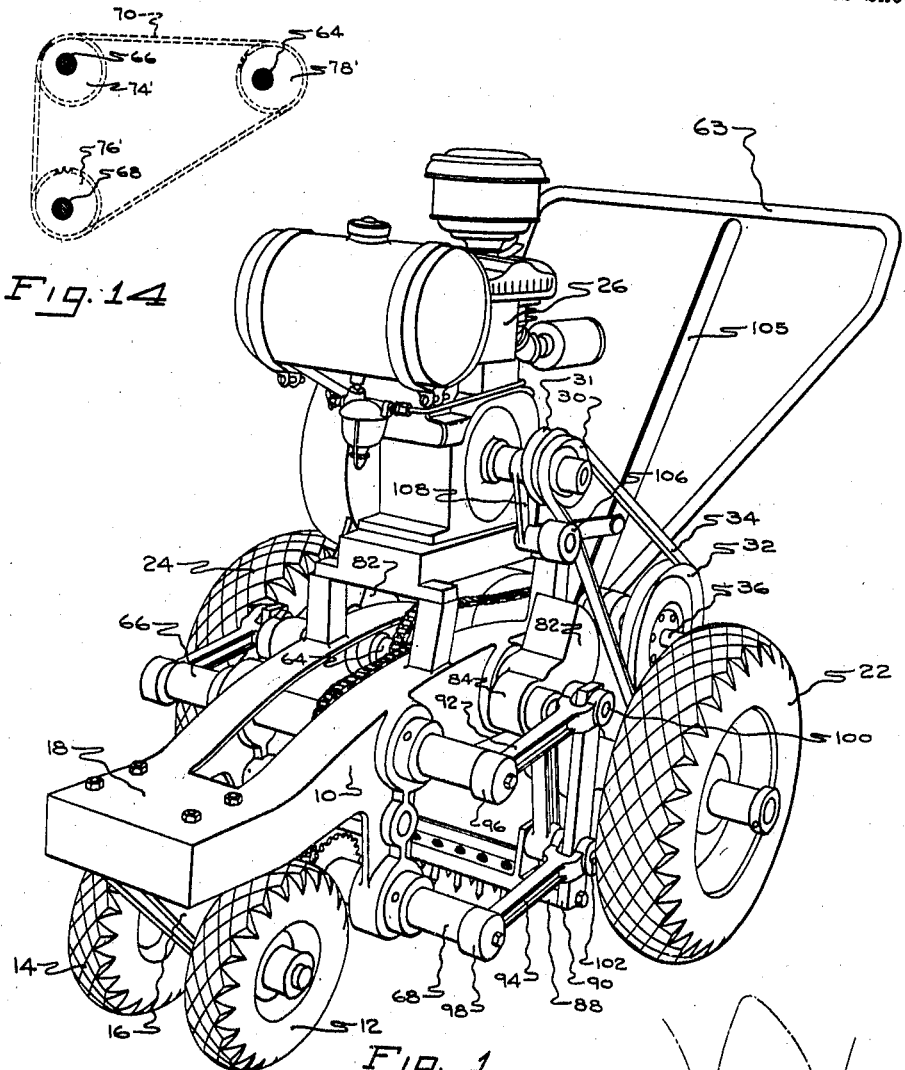

Inventor
HERMAN W. MELLING
By Beaman & Langford
Attorneys

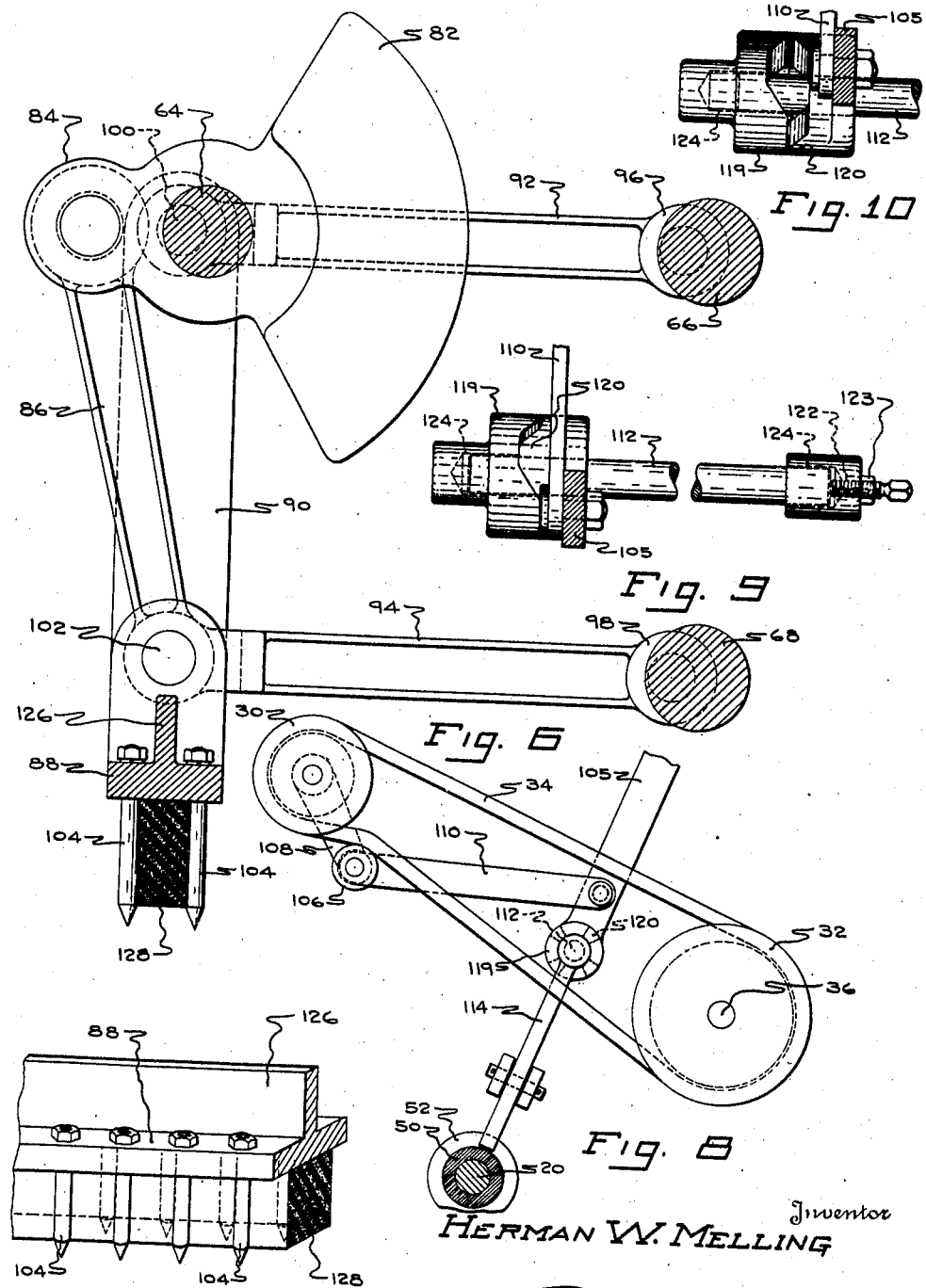

Patented May 2, 1944

UNITED STATES PATENT OFFICE 2,347,748

TURF PERFORATOR

Herman W. Melling, Jackson, Mich.

Application May 17, 1940, Serial No. 335,687

7 Claims. (Cl. 97—44)

The present invention relates to an improvement in machines for turf perforation to open up the soil around the grass roots for the reception of air, water, fertilizer, top dressings and other agents for the stimulation of grass growth. Lawns, golf greens, lawn tennis courts and the like where the turf is subjected to packing action are much in need of the type of perforator provided by the present invention.

According to the present invention a compact, power propelled and actuated perforator is provided which may be manually guided over the turf with ease. In contrast to similar apparatus heretofore proposed, the spikes or forks are driven into the turf with a sharp, hammer like blow rather than being shoved into the ground principally by the dead weight of the apparatus. To prevent tearing up the turf, I have provided a resilient pad, preferably of sponge rubber, adjacent which the turf perforating instruments are withdrawn from the ground. As it is desirable to avoid materially changing the angle of the spikes while they are in the ground to avoid tearing up the surface of the turf, means are provided to maintain the angle of the spikes while the machine is advancing over the turf. Any possible damage to the surface of the turf is completely avoided by keeping the spikes at right angle to the line of travel of the machine with operating mechanism whereby the spike bar stops the forward travel during the time the spikes are entering and leaving the turf although the machine moves at a uniform rate over the turf.

Thus one of the objects of the invention is to provide a machine of the aforesaid type having sharply "driven" instruments for perforating the turf.

Another object is to provide a turf perforator having perforating instruments which are driven into the turf principally through the direct action of a heavy rotated body of concentrated mass.

Another object is to provide a turf perforator having novel stripper means for the turf.

A further object is to provide a turf perforator which is power propelled at a uniform speed over the turf with novel mechanism having substantially no forward movement while being inserted and withdrawn from the turf to perforate the turf with substantially vertical holes.

A still further object is to provide a turf perforator in which the perforating instruments describe a generally cycloidal path.

Other objects and advantages residing in the differential drive of the wheel, order of operation of the drive wheel and spike bar, and arrangement, construction and combination of parts will appear from the following description and annexed claims.

In the drawings,

Figs. 1 and 2 are perspective views of my perforator,

Figures 4, 5:
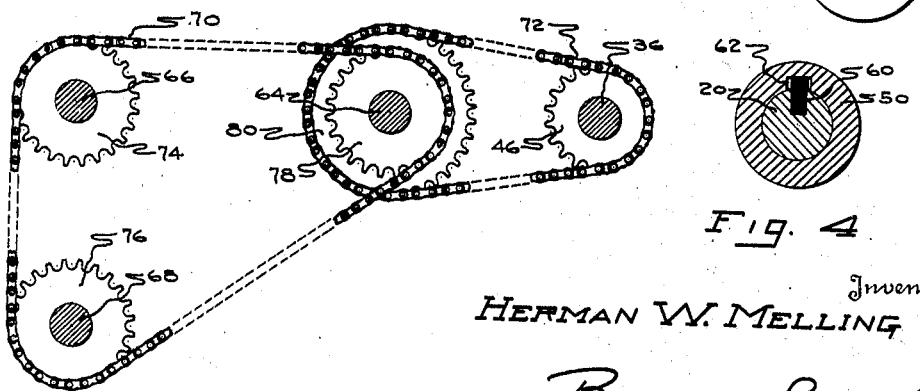
Fig. 4 is a cross-sectional view taken on line IV—IV of Fig. 3.

Fig. 5 is a sectional side elevational view showing the drive chain arrangement, Fig. 6 is a sectional side elevation view of the spike bar manipulating mechanism, Fig. 7 is a diagrammatic representation of the path of the spikes in entering and leaving the turf, Fig. 8 is a side elevational view of the drive mechanism, Fig. 9 is a fragmentary plan view of the clutch operating mechanism, Fig. 10 is a fragmentary plan view showing the clutch mechanism in de-clutching position, Fig. 11 is a perspective view of the needle bar shown in cross-section, Fig. 12 is a fragmentary sectional view of the needle bar showing the stripper compressed, Fig. 13 is a view similar to Fig. 7 of a modified spike path, Fig. 14 shows a modified form of drive in which the sprockets are eccentrically mounted, and Fig. 15 is a further modification of the drive showing the eccentricity of the sprockets limited to a single one.

Figure 3:
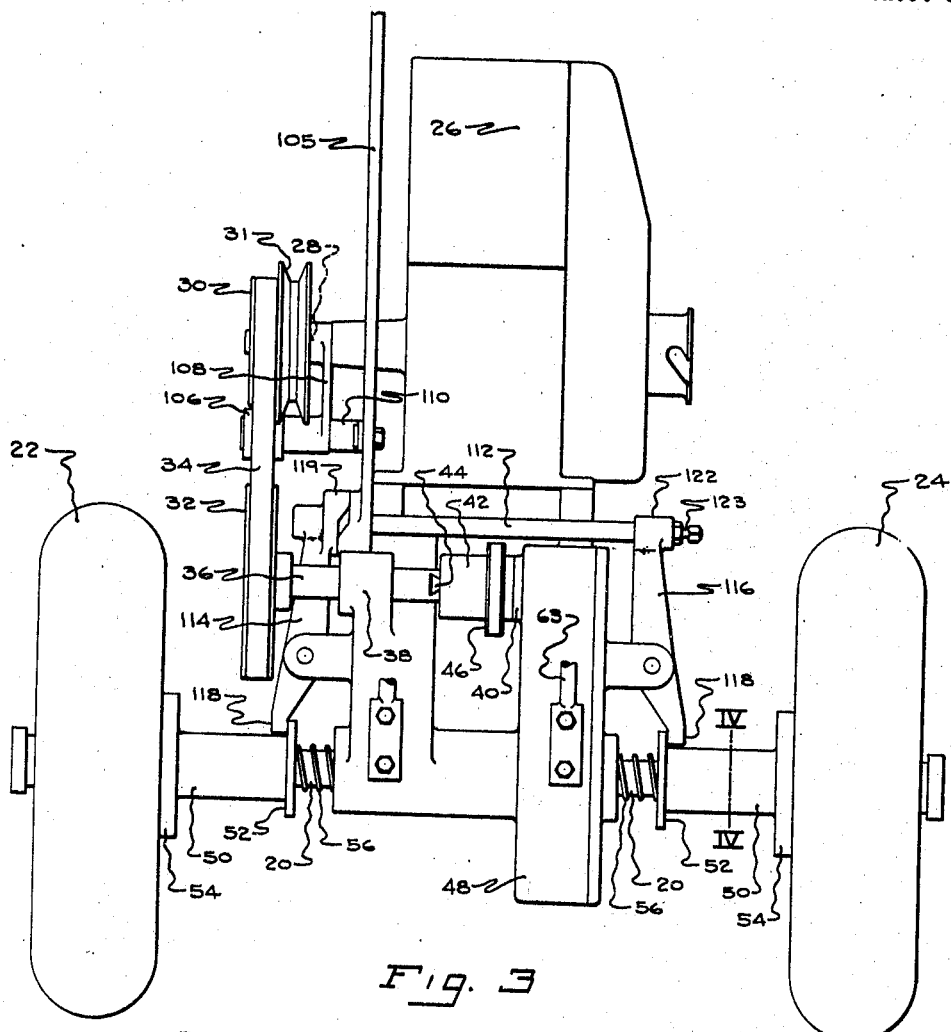
Fig. 3 is a rear elevational view of the machine.

Referring to Figs. 1, 2 and 3, my turf perforator comprises a frame 10, shown as of cast construction, supporting an axle 20 upon which the drive wheels 22 and 24 are supported for free rotation. Supported above the frame 10 is an engine 26 having a drive shaft 28 carrying V-pulleys 30 and 31 which drive the pulley 32 through a V-belt 34. The pulley 32 is supported upon a shaft 36 which is in turn supported in bearings 38 and 40. Keyed to the shaft 36 is a collar 42 which carries a manually slidable pin 44 for clutching and declutching the sprocket 46 to the shaft 36. The end of the shaft 36 extending into the reduction gear housing 48 through suitable reduction gearing, not shown, drives the axle 20. Axially slidable upon the axle 20 and keyed thereto are hubs 50 having flanges 52 at one end and internal drive cones 54 at the opposite ends. Springs 56 urged the hubs 50 outwardly to engage the cones 58 on the wheels 22 and 24 to drive the same from the axle 20. As shown in Fig. 4, the axle 20 is keyed to the hub 50 through keys 60 engaging in oversize keyways 62 in the hubs 50. In practice I use a $\tfrac{7}{8}$" key to drive in $\tfrac{15}{16}$" keyways in the hubs 50. This slight amount of clearance gives sufficient differential drive movement to the rear wheels 22 and 24 to enable a certain amount of steering to be effected by exerting a slight amount of steering force upon the handle 63. This small amount of differential drive of the rear wheel in practice is all that is needed for steering in performing the bulk of the work. At the same time both wheels are being positively driven thus reducing the possibility of loss of traction and forward movement which would result in the turf cultivating instruments digging up the ground.

As more clearly shown in Fig. 5, cross shafts 64, 66, and 68 are supported for rotation in suitable bearings in the frame 10 and are driven by drive chains 70 and 72 running over sprockets 74, 76, 78 and 80. The sprocket 80 is keyed on the shaft 64 and drives the sprocket 78. As the sprockets 74, 76, and 78 are all of the same size, it will be understood that the shafts 64, 66 and 68 are all rotated at the same speed in timed relation. Keyed to opposite ends of the shaft 64 and rotated thereby are heavy bodies or weights 82 having crank portions 84 to which rods 86 are pivotally secured for raising and lowering the spike bar 88 upon rotation of the shaft 64. At opposite ends of the spike bar 88 are uprights 90 to which rods 92 and 94 operating upon eccentrics 96 and 98 are pivotally connected on pins 100 and 102. As shown the pin 102 acts as a pivot for both the rods 86 and 94. Preferably the members 90, 92 and 94 are laid out to constitute a parallelogram so that the uprights 90 and thus the spikes 104 are always vertical. However, I anticipate having the arms 92 and 94 of different length with the resulting action upon the movement of the spike bar 88. As will be readily understood the stroke of the eccentrics 96 and 98 is such as produces a backward motion equal to the forward motion of balance of machine while spikes are in the ground. Through this arrangement, by timing the positions of the eccentrics 96 and 98 with the location of the cranks 84, the spike bar 84 has substantially no forward movement at the time the spikes 104 are being driven into and removed from the turf. Accordingly, my device is capable of perforating the turf with vertical holes if desired. In Fig. 7, the path traversed by the spikes 104 is illustrated which I choose to describe as generally cycloidal for lack of a better term.

The mechanism for selectively driving the spike bar 88 and drive wheels 22 and 24 has been designed to be entirely controlled by a single lever 105. In the form illustrated the main drive belt 34 is loosened and tightened through manipulation of a roller 106 supported for swinging movement on the arm 108 for engaging with the back side of the belt. To control the action of the arm 108, a connecting link 110 is connected to the lever 105 adjacent its pivotal connection on the rod 112. Supported on the sides of the frame 10 for pivotal movement are clutch operating levers 114 and 116 having nose portions 118 which engage with the flanges 52 to declutch the wheels 22 and 24 from the drive shaft 20 by moving the hub 50 inwardly compressing the spring 56. Rocking movement is imparted to the levers 114 and 116 through rocking the lever 105 which results in a spreading movement between the upper ends 119 and 122 of the levers 114 and 116, the cam 120 forcing one from another. As the rod 112 is secured to the cam 120 at one end and abuts the adjustable stop 123 of the lever 116 at the other end, partial rotation of the cam 120 increases the effective length of the rod 112 to rock the levers 114 and 116. The portions 119 and 122 are shown with recesses 124 in which the rod is supported and guided.

The spike bar 88 is illustrated as being of rigid T-section having a row of pointed spikes 104 upon opposite sides of the web 126. To avoid any possibility of the turf being picked up by the needles when being withdrawn, I propose the association of a stripper with the spike bar 88. Although the stripper may take numerous forms, I have found in practice that an elongated strip of sponge rubber 128 of the thickness substantially equal to the length of the spikes 104 snugly fitted between the spike rows will stay in place and will function as a satisfactory stripper. In Fig. 11 the strip 128 is shown expanded with the bar 88 out of the turf, while in Fig. 12 the strip 128 is shown compressed with the spikes 104 in the turf. The use of a stripper, however, is not necessary under ordinary conditions.

The operation of the machine is as follows: With the engine 26 running and the machine stopped, the lever 105 is in the forward position of Fig. 10. In this position the levers 114 and 116 are holding the hubs 50 out of driving relation with the rear wheels 22 and 24 and the roller 106 is swung forward out of contact with the belt 24. To cultivate the turf, the first movement of the lever 105 rearwardly releases the levers 114 and 116 to the action of the springs 56 to clutch the wheels 22 and 24 to the drive axle 20; continued movement of the lever 105 bringing the parts into the position of Fig. 9 to sufficiently tighten the belt 34 to drive the shaft 36. In this manner operation of the spike bar 88 is always accompanied by forward movement of the machine. To stop the machine, the initial forward movement of the lever 105 will loosen the belt 34 to interrupt the drive of the spike bar 88 while continued movement will declutch the rear wheels 22 and 24 giving free wheeling for turning around. This arrangement prevents any possibility of the spike bar 88 being driven while the rear wheels are declutched from their drive axle. When the machine is being moved from one place to another, the pin 44 is removed to interrupt the drive of the spike bar 88, and the belt placed on pulley 31 to increase traction speed.

In machines heretofore designed for perforating the turf, flywheels have been used to aid in forcing the instrument into the ground. The present invention, however, among others has the following structural and functional distinguishing features: (1) The blows delivered by heavy rotary masses 82 are directly transmitted through thrust members to opposite ends of a rigid spike bar in lieu of being delivered through a crankshaft subject to tortional deflections. (2) There is only a single linkage between the rotated mass and the turf perforating instrument. (3) The heavy rotating masses delivers a sharp hammer-like blow to the spike bar with the spike bar relatively free from forward movement with respect to the turf with the spikes moving vertically into the turf. (4) Kinetic energy stored up in the rotating masses is only dissipated through a small arc of each cycle of rotation. (5) The spikes are driven into the turf at the point of maximum effectiveness of the linkage transmitting the kinetic energy of the rotated masses.

As heretofore described in detail, the eccentrics 96 and 98 upon the shafts 66 and 68 advance and retard the movement of the spike bar relative to the travel of the machine over the turf. By coordinating the raising and lowering of the spike bar 88 through the timing of the shaft 64, the spikes 104 are caused to enter and leave the turf during a period of relatively no forward movement. The sponge rubber stripper 128 is compressed by the turf and then extended during each cycle of operation of the spike bar 88. Because the stripper offers very little resistance to compression it does not pack the turf yet its inherent resiliency is adequate to cause the spikes 104 to be withdrawn without pulling up the turf.

In order that my machine be practical, it must necessarily be of relatively heavy construction as compared to power lawn mowers and other devices manually guided over turf. As lawns and putting greens are invariably hilly and rolling the drive wheels must act also as brakes to prevent the operator from losing control of the machine going down a grade. For this reason it is an advantage to have both rear wheels always in gear and capable of both resisting any tendency to overrun through the braking action of their driving mechanism. Through the use of the keys 60 in the oversize keyways 62, sufficient differential movement of the rear wheels is possible to take care of normal steering requirements without compelling the operator to skid one of the rear wheels in order to operate the machine in the desired direction. Obviously, to effect any abrupt change in direction of the machine, it will be advisable to declutch the rear wheels to permit them to free wheel rather than to skid the rear end of the machine around, sliding one of the wheels.

In Fig. 7 the path 130, which is traced by all parts of the spike bar 88, and its associated spikes 104, is shown with elongated loop portions 132 indicating slight lateral movement of the spikes 104 while in the ground 134. My experience to date indicates that this lateral movement tends to loosen and soften up the turf adjacent the holes. When the turf is inspected, the holes formed by the spike 104 appears to be perfectly round and perfectly vertical.

As should be readily understood, the characteristics of the path 130 of Fig. 7 may be altered by shortening and lengthening the throw of the eccentrics 96 and 98. In Fig. 13, the path 134 is shown in the form of a single vertical line 136 to indicate that the spikes follow the same path in entering and leaving the turf. This result may be conveniently accomplished in my machine through an eccentric arrangement of the sprocket drive for the shafts 66 and 68. In Fig. 14 the sprockets 74', 76' and 78' are all eccentrically mounted upon the shafts 64, 66 and 68, with the chain 70 shown engaging in timed relation the arcs of smaller radii of the sprockets 74' and 76' and the arc of greater radii on the sprocket 78. This will cause the shafts 66 and 68 to have accelerating and decelerating movement which, when coordinated with the throw of the eccentrics 96 and 98 upon the shafts 66 and 68 and the rate of forward travel of the machine, makes it possible to conveniently obtain the path of travel 136 of the spike 104 shown in Fig. 13 while in the ground. At the sacrifice of having the chain 70 operate under uniform tension, the arrangement of Fig. 14 is shown simplified in Fig. 15 by limiting the eccentric mounting of the sprockets to the sprocket 78'' upon the shaft 64. Similar accelerations and decelerations of the shafts 66 and 68 will result.

In evaluating the structural features of my machine, I consider the mounting of all the perforating instruments upon a single bar to be of decided advantage. This enables the dissipation of kinetic energy stored up in the rotated masses 82 to be restricted to approximately ⅛ of the rotation of the shaft 64 and the placing of spikes as close together as desired. In practice there is little or no tendency for the engine 26 to be slowed down although of low horsepower. Except for the sharp character of the blow being delivered by the spike bar 88, the resistance of the turf to penetration by the spikes 104 is sufficient to lift the wheeled carriage from the turf.

Having thus described my invention, what I desire to secure by Letters Patent and claim is:

1. A turf perforating machine comprising a rigid bar carrying a plurality of perforating instruments, a rotated shaft located above and parallel to said bar, heavy bodies of concentrated mass mounted upon opposite ends of said shaft and rotated therewith, and a direct crank and rod connection between said bodies and the ends of said bar.

2. A machine as defined in claim 1 including guiding means for vertically disposing said instruments in all positions.

3. A machine as defined in claim 1 including means for shifting said bar relative to said shaft along the line of travel of the machine.

4. A machine as defined in claim 1 including guiding means for vertically disposing said instruments, and means associated with said guiding means for shifting said bar relative to said shaft along the line of travel of the machine.

5. A turf perforating machine comprising a wheeled carriage, transverse drive shafts in said carriage, mechanism for driving all of said shafts in fixed relation, wheels upon one of said shafts for propelling said carriage over the turf at a uniform speed, a transverse bar carrying spikes, crank and rod connections between said bar and one of said shafts for raising and lowering said bar to perforate the turf, a second crank and rod connection between said bar and another of said shafts for moving said bar along the path of movement of said carriage over the turf, the relative angularity of said cranks upon said shaft being arranged to cause said bar to move rearwardly at approximately the same rate of forward movement of the carriage during that portion of the cycle of operation when the spikes are entering and leaving the turf.

6. In a turf perforating machine, the combination with a wheeled carriage, of perforating means, carriage propelling means, means actuating said perforating means, a prime mover, a common power take-off for said propelling and actuating means, a clutch in said carriage propelling means, an operator for said clutch, a clutch between said prime mover and said common power take-off, an operator for said second clutch, a manually operated lever, and operative connections between said lever and said clutch operators for operating said clutches in a predetermined order.

7. A turf perforating machine comprising a carriage having drive wheels, a spike bar which is raised and lowered to perforate the turf, driving mechanism for said wheels including clutch mechanism operable to permit free wheeling, means for actuating said spike bar, a prime mover, power transmitting means for driving said wheels and said spike bar together, a clutch in said power transmitting means, a single control lever, and operative connections between said lever and said clutches for operating said clutch in a predetermined manner.

HERMAN W. MELLING.